United States Patent [19]

Reuter

[11] 4,247,976
[45] Feb. 3, 1981

[54] METHOD FOR PRODUCTION OF A TURNTABLE WITH STROBOSCOPE MARKS

[75] Inventor: Rudolf Reuter, St. Georgen, Fed. Rep. of Germany

[73] Assignee: Dual Gebrüder Steidinger, St. Georgen, Fed. Rep. of Germany

[21] Appl. No.: 972,365

[22] Filed: Dec. 22, 1978

[51] Int. Cl.³ .................... B22D 11/126; G11B 1/00
[52] U.S. Cl. .................................. 29/527.4; 369/548; 369/264
[58] Field of Search .................... 29/527.4; 274/1 K

[56] References Cited

U.S. PATENT DOCUMENTS

| 2,851,000 | 9/1958 | Kaplan et al. | 29/527.4 X |
| 3,270,414 | 9/1966 | Plurien et al. | 29/527.4 X |

*Primary Examiner*—Francis S. Husar
*Assistant Examiner*—V. K. Rising
*Attorney, Agent, or Firm*—Martin A. Farber

[57] ABSTRACT

A method for production of a turntable which carries stroboscope marks with a metallic surface on the face side of its rim, the metallic surface relative to its dark colored intermediate spaces being elevated. In the edge vicinity of a disc which is made of good deformable metal and which by bending its edge downwardly forms the face side of the rim of the turntable, before the bending of the edge, recesses are stamped-in, which recesses correspond to the intermediate spaces of the stroboscope marks. After the bending and the dark coloring, the disc is lightly cut in the width of the stroboscope marks, which width is chosen somewhat smaller than that of the stamped-in intermediate spaces, in order to achieve a contrast in lightness between the lightly cut stroboscope marks and the deeper intermediate spaces. The turntable comprises a lower part substantially contributing to a flywheel mass, on which lower part there rests a disc as an upper plate, the disc being non-rotatable with respect to the lower part. The disc is made of an easily deformable metal. In the face side of a downwardly extending rim of the disc there are dark colored recesses which form the intermediate spaces of the stroboscope marks.

2 Claims, 2 Drawing Figures

METHOD FOR PRODUCTION OF A TURNTABLE WITH STROBOSCOPE MARKS

FIELD OF THE INVENTION

The invention relates to a method for production of a turntable which carries stroboscope marks with a metallic surface on the face side of its rim, the metallic surface with respect to its dark colored intermediate spaces being elevated.

BACKGROUND AND PRIOR ART

Providing the stroboscope marks on the pulled-down rim of the turntable has proven to be particularly advantageous.

It is known to apply such marks in a printing process, whereby the rim of the plate is rolled on a printing roller. With such a method the possibilities of formation of the rim of the plate and the marks, respectively, are limited insofar as only a planar printing image or picture can be produced. Moreover as a result of the unavoidable diameter tolerances, the roll-off methods also do not permit an exact maintenance of the spacing of the divisions and edge-sharp marks, respectively.

It is further known to produce the turntable with use of a mold as a die casting part and simultaneously also to apply the stroboscope marks so as to project with respect to the rim of the plate. The necessary contrast in lightness between the marks and their intermediate spaces is achieved by coloring the plate and subsequently lightly cutting the projecting marks. Indeed by the plastic, prominent standing-out marks, which marks can be rectangular or round, the marks have a substantially better appearance; however because of the necessary form-ability of the turntable, properly narrow limits are set for the design possibilities, particularly if several rows of marks are to be provided for different rotational speeds or frequencies, as customarily is the situation. In these cases, for example, the rim of the plate can not even be approximately cylindrical.

A further disadvantage is that by means of the deformation (elevation impact or eccentricity) which is unavoidable during the production of the plate, when the turntable turns, an image of the marks results which wanders in the rhythm in the rotational speed. With rectangularly shaped marks this indeed can be made inconspicuous by lightly cutting the marks only on a part of their lengths. The recess depth with the light cutting must still be comparatively large because of radial eccentricity or impact of the plate caused during production, so that unsightly, sharp and differently or dissimilarly high, grater-like contours develop. Moreover such a turntable is comparatively expensive.

It is generally known to produce contours by stamping (as in coin production), which contours project with respect to a surface. Such a method, however, because of the necessary high pressure is not suited for the production of the stroboscopic marks of concern here.

OBJECT OF THE INVENTION

It is an object of the present invention to apply stroboscope marks with a metallic surface, which marks are applied, elevated with respect to their dark colored intermediate spaces so that they prominently stand out plastically or three-dimensionally, on a turntable rim which is inclined arbitrarily from a conical-shape to a cylindrical-shape, and to do same in an improved manner, respectively.

SUMMARY OF THE INVENTION

This object is aided in its solution by providing a method for the production of a turntable of the type mentioned in the first paragraph of this specification, by which in the edge vicinity of a disc (e.g., 3) which is made of good deformable metal, preferably aluminum, and which by bending its edge (4) downwardly forms the face side of the rim of the turntable, before the bending of the edge (4), recesses (e.g., 5, 6) are impressed or stamped-in, which recesses correspond to the intermediate spaces of the stroboscope marks (7, 8), and after the bending and the dark coloring the disc (3) is lightly cut (or its outside diameter is turned) in the width of the stroboscope marks (7, 8), which width is chosen somewhat smaller than that of the stamped-in intermediate spaces (5, 6), in order to achieve a contrast in lightness between the lightly cut stroboscope marks (7, 8) and the deeper intermediate spaces (5, 6).

Surprisingly it has been shown that the necessary high preciseness in the position of the marks concerning their division spacings and their running within a radial plane relative to the record turntable axis can be maintained in spite of the strong material deformation during bending of the rim of the disc. Particularly, by the stamping of the marks in the disc material, advantageous preconditions are created for the later bending of the rim with respect to the accuracy of shape of the finished plate. The production of the stroboscope marks concerned with here, by providing the recesses in a planar sheet metal plate with subsequent deformation makes it possible to avoid the disadvantages described above with respect to the pressure casting methods.

The method of a present invention is most important since the turntable with a direct drive (with its associated expense for control) only needs so little mass that an aluminum disc for example of 2 mm thickness alone suffices.

As is known turntables not only carry the record disc, but serve generally even still for the stabilization of the rotational speed, in that they act as a flywheel mass. In order to provide a turntable of a sufficient flywheel mass with stroboscope marks with a metallic surface, which stroboscope marks are elevated compared to their dark colored intermediate spaces, it was previously necessary to produce same in die casting metal processes. It is known per se to use a flywheel massloaded lower plate, on which lower plate there rests a light sheet metal plate. These latter mounted plates however were previously not used in order to provide the turntable with the stroboscope marks concerned with here, which also would not have been possible without anything more, but they served other special purposes. Moreover for the loose or detached placement on the turntable, planar sheet metal discs with printed stroboscope marks have been used. These are however cumbersome in handling.

A further solution and object of the previously mentioned task and object with with respect to the application of the stroboscope marks concerned with here is to provide a turntable of the introductory mentioned type characterized in that the turntable in a per se known manner is made of a lower part (1) essentially or substantially contributing to a flywheel mass, on which lower part there rests a disc (3) as an upper plate, the disc being non-rotatable with respect to the lower part (1), whereby this disc (3) is made of an easily or slightly deformable metal, preferably aluminum, and it contains, in the face side of its rim (4) which extends downwardly, dark colored recesses which form the intermediate spaces (5, 6) of the stroboscope marks (7, 8).

The importance of this solution resides in that the stroboscope marks are formed by recesses in the edge or rim of an additional sheet metal plate, because by the introduction of the recesses in a sheet metal plate, which can be brought about by stamping or by etching, the use of the combination with a lower plate for the mass increase is possible, and consequently one avoids the problem of the opening of the mould or removability from the mold as it exists with a die cast plate, and respectively, the limitations connected therewith, and because such a sheet metal plate also may be produced with more accuracy of shape, for the light cutting in the area of the marks, a smaller stock or metal removal is necessary, whereby the grater-like character is avoided better. Moreover such a plate with the stroboscope marks dealt with here, with the same mass permits a cheaper production than the previous production.

By production of the marks by recesses it is particularly possible to make these in the planar condition of the disc all with one impact with relatively small forces and consequently quite economically.

Further in accordance with another object and feature of the present invention further the lower part (1) can be a plate made of steel sheet metal.

BRIEF DESCRIPTION OF THE DRAWING

With the above and other objects and advantages in view, the present invention will become more clearly understood in connection with the detailed description of one preferred embodiment, when considered with the accompanying drawing, of which.

DETAILED SPECIFICATION

Figure 1:
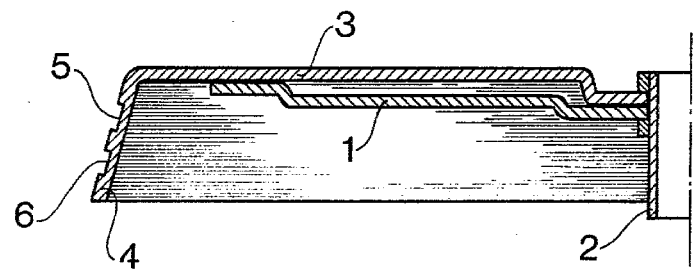
FIG. 1 is a semi-sectional view of a turntable.
Figure 2:
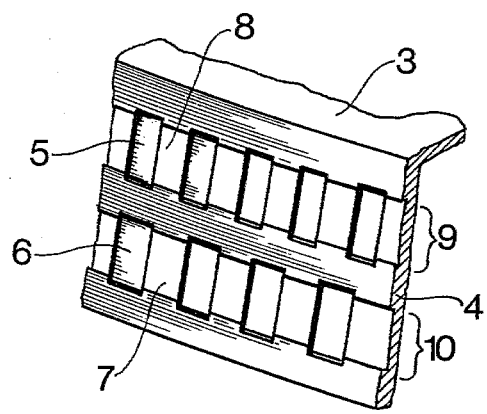
FIG. 2 is an enlarged partially cut away section of the rim of the turntable.

Referring now to the drawing, on a plate which is stamped out of steel sheet metal and which forms the lower part 1 of the turntable and comprises an essential or substantial part of the entire turntable-flywheel mass, there rests a disc 3 made of e.g., 2 mm thick aluminum sheet metal. Both parts 1, 3 are non-rotatably connected with one another by means of the turntable bearing 2. The disc 3 carries on the face side of its downwardly bent-off rim 4, two rows of stroboscope marks 7, 8. The intermediate spaces 5, 6 of the stroboscope marks 7, 8 were deeply impressed or stamped-in before the bending-off of the rim 4, all simultaneously with a stamp. After the bending-off of the rim 4, the disc 3 was colored black and then lightly cut or turned on the outside diameter over the width of the stroboscope marks 7, 8, whereby the width 9, 10 was selected somewhat smaller than that of the deeper intermediate spaces 5, 6, so that during rotation of the record turntable the stroboscope marks 7, 8 run exactly on a circular path relative to the axis of the turntable, and a smooth image of the marks is provided when the turntable rotates.

Herein the term "width" is defined as the width of the imaginary rings defined by the stroboscope marks 7 or 8, or by the recesses 5 or 6, namely, this width of the stroboscope marks or recesses is measured in a direction substantially axially parallel to the turntable axis or bearing.

While I have disclosed one embodiment of the present invention it is to be understood that this embodiment is given by example only and not in a limiting sense.

I claim:

1. A method for the production of a disc with stroboscope marks comprising the steps in sequence of stamping recesses in the vicinity of the edge of a deformable planar metal disc, said recesses defining therebetween intermediate areas for stroboscope marks, bending said edge downwardly to form a rim and coloring said disc dark, lightly cutting said areas to a depth less than that of said recesses and in a width of said stroboscope marks which width is slightly smaller than that of said recesses, the latter corresponding to intermediate spaces of said stroboscope marks, whereby a contrast in lightness is achieved between the lightly cut stroboscope marks and the deeper recesses.

2. The method as set forth in claim 1, wherein said disc is made of aluminum.

* * * * *